United States Patent [19]
Carlson

[11] 3,731,759
[45] May 8, 1973

[54] ACOUSTIC FILTER

[75] Inventor: Duane G. Carlson, Ossining, N.Y.
[73] Assignee: International Business Machines Corporation, Armonk, N.Y.

[22] Filed: Mar. 15, 1972
[21] Appl. No.: 234,943

[52] U.S. Cl...............181/0.5 F, 181/.5 AG, 181/.55, 333/71
[51] Int. Cl...............H03h 9/00
[58] Field of Search..............333/71, 72; 181/0.5 F

*Primary Examiner*—Roy Lake
*Assistant Examiner*—Darwin R. Hostetter
*Attorney*—George Baron et al.

[57] ABSTRACT

An acoustic analogue of an electronic high-pass filter. A doped semiconductor, whose conduction electrons satisfy degenerate statistics, is placed adjacent a generator of acoustic waves and such doped semiconductor highly attenuates phonons of a frequency of less than $f_o$ but transmits those acoustic waves having a frequency of $f_o$ and higher, where $f_o = {}_{kF}V_a/\pi$, and $k_F$ = Fermi wave vector, etc. This $f_o$ would vary between 500 MHz and 500 GHz, depending on doping. By employing such high-pass filter in series with a superconductor low-pass filter, one can obtain a highly monochromatic beam of phonons.

6 Claims, 8 Drawing Figures

ACOUSTIC FILTER

BACKGROUND OF THE INVENTION

In a paper entitled "Observation of Quantum Effects in the Spectrum of Piezoelectrically Amplified Acoustic Flux in GaAs" by A. Segmüller and applicant which appeared in the July 26, 1971 issue of the Physical Review Letters, Vol. 27, No. 4, the authors, using the technique of X-ray scattering, observed the spectrum of acoustoelectrically amplified phonons in the quantum limit, where the conduction-electron system obeys quantum statistics and the observed phonon wave vector $q$ is comparable to the electron Fermi wave vector $k_F$. When doped GaAs, having degenerate carrier distributions, was studied for its acoustic transmissive properties, a dramatic quantum anamoly consisting of an abrupt decrease in phonon gain was observed for $q$ larger than $2k_F$. These experiments were done in the presence of a dc electric field; in the absence of the field, the phonon gain becomes loss, and one would see an abrupt decrease in phonon loss. It is this abrupt change is loss (not gain) which is exploited in the invention.

Such abrupt decrease in phonon loss can be exploited to create an acoustic high-pass filter. An ideal high-pass filter completely rejects spectral components below a cut-off frequency $f_o$ but passes unattenuated spectral components above $f_o$. One embodiment of the novel filter consists of a degenerately doped piezoelectric semiconductor with a phonon source bonded to one side of the semiconductor. The acoustic losses due to piezoelectric coupling to the free electrons in the semiconductor can be made very large for acoustic wave vectors $q<2k_F$, where $k_F$ is the electron Fermi wave vector. However for $q>2k_F$, the acoustoelectric losses are essentially zero. Furthermore, the rate of change of the attenuation at $q=2k_F$ can be made very large. Thus, the attenuation characteristic described above would represent an acoustic high-pass filter with cut-off frequency $f_o=k_F V_a/\pi$ where $V_a$ is the acoustic velocity through the semiconductor.

In another embodiment of the invention, the high-pass filter described above is in series with a low-pass filter comprising a superconductor having an energy gap $2\Delta$, and the superconductor is placed in the path of a broad band source of phonons. Those phonons from the broad band source which impinge on the superconductor and have an energy greater than $2\Delta$ will break Cooper pairs, creating quasi-particle excitations above the energy gap as they (the high energy phonons) are absorbed in the process. However, the quasi-particles will relax to the gap edge and in the process emit phonons which have energy less than $2\Delta$. The quasi-particles at the gap edge form Cooper pairs and each pair emits a phonon of energy $2\ \Delta$.

To eliminate that part of the phonon spectrum from energy zero to $2\Delta-\delta$, the high-pass degenerately doped filter described herein above is placed to receive the phonon output of the superconductor filter, $\delta$ represents the energy band width of the transmitted phonons. The high-pass semiconductor filter would be chosen to have a Fermi wave vector such that $k_F=V_a(2\Delta\delta)/2h$. The two matched filters, superconductor low-pass filter and degenerately doped semiconductor high-pass filter, when used in series, produce an intense monochromatic beam of phonons of energy $2\Delta$ and of energy band width $\delta$.

Consequently, it is an object of this invention to achieve a high-pass acoustical filter using a doped semiconductor as the filtering element.

It is yet another object to provide a high-pass filter for acoustic waves with a cut-off that is adjustable between 500 MHz and 500 GHz.

It is yet another object of this invention to provide a high-pass acoustic filter in conjunction with a low-pass acoustical filter to attain a monochromatic beam of phonons in the 500 MHz – 500 GHz range.

The foregoing and other objects, features, and advantages of the invention will be apparent from the following more particular description of the preferred embodiments of the invention as illustrated in the accompanying drawings.

DESCRIPTION OF THE DRAWINGS

In FIG. 1A is shown a source 2 of polychromatic phonons whose beam 4 of phonons impinge upon a doped semiconductor 6, the latter serving as a filter of such polychromatic phonon beam, absorbing those phonons that have a frequency $f_o=k_F V_a/\pi$ and transmitting a phonon beam 8 whose frequencies are greater than $f_o$ cps. A detector 10 is used to sense the frequencies of such beam 8.

In choosing the type of semiconductor and doping level so that element 6 can act as a high-pass filter, the following relationships are considered. Firstly, the semiconductor is chosen so that its conduction electrons satisfy degenerate statistics or, stated mathematically, $E_F/kT>>1$ (1). $E_F$ is the Fermi energy and $kT$ is the thermal energy where $T$ = absolute temperature and $k$ is Boltzmans's constant. $E_F=\hbar^2 k_F^2/2m^*$ (2) where $\hbar$ is Planck's constant, $k_F$ is the electron Fermi wavevector and $m^*$ is the effective electron mass. $k_F$ can also be expressed in terms of the number of electrons per cm$^3$, $n_o$, in the semiconductor using the relationship $k_F=(3\pi^2 n_o)$ (3) so that equation (2) can be written as $E_F=\hbar^2(3\pi^2 n_o)/2m^*$ (4). For GaAs, to act as a high-pass filter so that only acoustical frequencies $2\times10^{11}$ cps will pass through it, the GaAs is doped with selenium, the number of free electron carries $n_o=2.2\times10^{17}$ per cm$^3$, and the temperature T at which the GaAs is maintained is ~20°K. Higher temperatures can be used as long as $E_F/KT>>1$ is satisfied. At high temperatures, you must have higher doping to satisfy $E_F/kT>>1$; the higher doping causes $f_o$ to increase. If the GaAs filter is employed at a higher temperature, e.g., $T=77°K$, then $n_o=3\times10^{17}$ per cm$^3$. It is understood that other heavily doped semiconductors can be employed, with InSb being one of those additional candidates, and the choice will depend upon achieving the relationship $E_F/kT>>1$ for the semiconductor. Other factors such as ease of manufacture, cost of the semiconductor, type of transducers that can be coupled to the semiconductor, etc. will be considered in determining the semiconductor selected.

Figure 2:
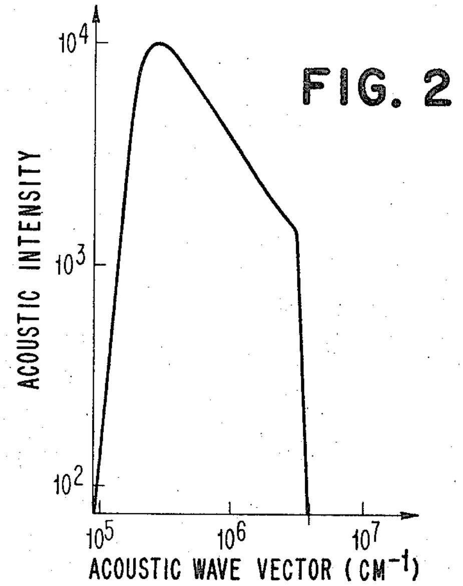
FIG. 2 is a plot of acoustic attenuation as a function of phonon wavevector.

In one example of carrying out the invention, a beam of phonons was launched perpendicularly to transducer semiconductor 6 so that a transverse acoustic wave was propagated along the <110> direction of the doped GaAs crystal 6. A sensing of the phonon beam 8 that is transmitted by doped semiconductor 6 due to the launched acoustic wave, that has traversed the semiconductor 6, by detector 10 showed that all acoustic frequencies below $10^{11}$ cps were cut off by the semiconductor 6. A plot of acoustic attenuation versus phonon wavevector $q$ in FIG. 2 indicates that acoustical frequencies greater than $10^{11}$ cps are transmitted, the cut off frequency being very sharp at $q=2k_F$ because in a degenerate electron gas it is not possible for an electron to conserve energy and momentum when absorbing a phonon with $q>2k_F$. That attenuation cut-off frequency $f_o$ which is equal to $k_F V_a/\pi$ is a parameter that can be varied to suit the desired application by changing $n_o$. In general, $f_o$ will be altered over several orders of magnitude by varying the doping concentration in a selected semiconductor.

In actual construction, the filter consists simply of a semiconductor for which $E_F/kT>>1$ and the semiconductor must be oriented so that the type of acoustic wave that you want to filter will couple to the free electrons in the semiconductor. A device using a high-pass filter comprises a doped semiconductor 6 which is about 2 to 3 mils thick, onto which is deposited a $SiO_2$ layer 12 (see FIG. 1B) approximately 1,000A thick and onto such $SiO_2$ layer is deposited a 600–1,000A metal film 14 of gold or of an alloy Constantan. When a heat pulse was generated by passing a current pulse of $10^{-7}$ seconds duration through the metal film 14 when GaAs selenium doped with $3\times10^{17}$ free electron carries per $cm^3$, was the semiconductor used at ~77°K, the acoustic attenuation curve looked like that shown in FIG. 2.

The advantages of a high-pass acoustic filter can be exploited to provide a system for generating a monochromatic beam of phonons in the 500 MHz to 500 GHz range, that is, the novel filter can be used with a superconductor as described hereinbelow.

Figure 3A:
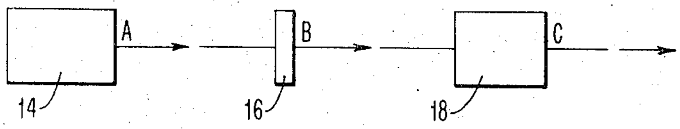
FIGS. 3A and 3B are schematic showings of how the invention of FIGS. 1A and 1B are employed to achieve a monochromatic source of phonons.
Figure 4A:
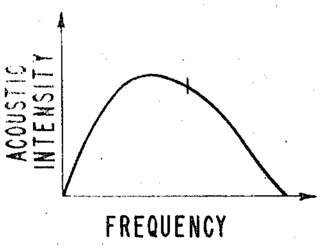
FIGS. 4*a*, 4B and 4C show a series of plots of acoustic intensity versus wavevector for illustrating the operation of the system of FIG. 3.
Figure 4B:
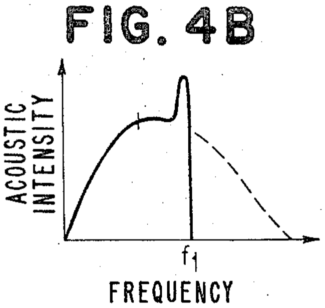

FIG. 3A is a schematic representation of the novel system for generating monochromatic phonons. A source of broadband phonons 14 could be any one of the many such generators described on pages 233–291 of the text "Physical Acoustics" published by the Academic Press of New York in 1968, Volume V, and edited by W. P. Mason. The author of the chapter on phonon generators is R. J. von Gutfeld. If one were to draw a curve of acoustic intensity versus frequency, the distributional curve at point A would look like that shown in FIG. 4A. Such superconductor 16 is a low-pass filter and has an energy gap of 2Δ. Phonons from source 14, incident on superconductor 16 and having energies greater than 2Δ, will break into Cooper pairs, creating quasi-particle excitations above the energy gap, and thus be absorbed. However, the quasi-particles will relax to the gap edge by emitting phonons having energies less than 2Δ. The quasi-particles at the gap edge form Cooper pairs and emit a phonon of energy 2Δ for each pair. Thus, the acoustic attenuation as a function of frequency plot at point B appears as is shown in FIG. 4B with the dotted portion of the plot representing that portion of the curve of FIG. 4A that was filtered by the superconductive filter 16. The cut-off frequency $f_1$, representing the highest frequency transmitted by the low-pass filter 16, is equal to $2\Delta/2\pi\hbar$ or $\Delta\pi/\pi\hbar$.

Figure 1A:
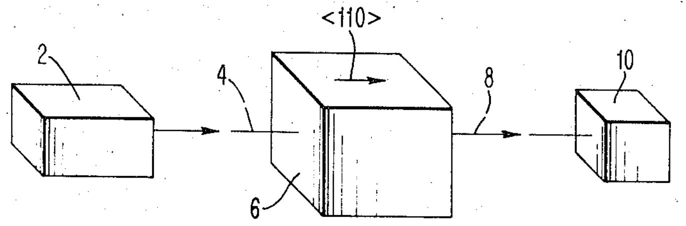
FIGS. 1A and 1B show an embodiment of the novel high-pass acoustical filter.
Figure 1B:
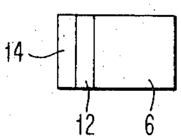
Figure 3B:
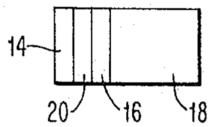
Figure 4C:
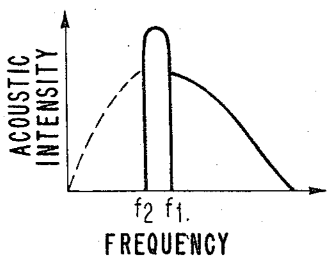

When the phonons that exit from superconductor 16, and having the acoustic intensity versus frequency plot of FIG. 4B, impinge upon the high-pass acoustic filter 18, the latter being a unit comprising the doped semiconductor 6 unit similar to that shown in FIG. 1, the lowest frequency $f_2$ that will be transmitted by such filter 18 is equal to $k_F V_a/\pi$, where $k_F$ is the electron Fermi wavelength and $V_a$ is the acoustic velocity through the semiconductor. Thus FIG. 4C represents the frequency spectrum $f_2-f_1$ of the phonons at point C of the system of FIG. 3, the dotted line in FIG. 4C representing those low frequencies being cut-off by filter 18. If the semiconductor of unit 18 is doped to have a Fermi wavevector $k_F=V_a/2\hbar(2\Delta-\delta)$, then the matched filters of FIG. 3 can be used in conjunction with a source of broad band phonons to attain an intense monochromatic beam of phonons having an energy of 2Δ and a bandwidth of δ.

In an actual construction of the phonon monochromator of FIG. 3A, one begins with a properly doped semiconductor a few mils thick, onto which is deposited the superconductive metal layer 16 of the order of 600–1,000A in thickness, over which is deposited a protective layer 20 of $SiO_2$ of the order of 600–1,000A thick, with the heat pulse generating layer 14 of gold, Constantan and the like of the order of 400–600A thick deposited upon the $SiO_2$ layer 20. The $SiO_2$ layer prevents short circuiting by the superconductive metal 16 of the heat pulse generating metal layer 14.

By using the teachings of the present invention, one can provide a sharp high-pass filter for acoustic waves with a cut-off that is adjustable between 500 MHz and 500 GHz. Additionally, this filter, in conjunction with a superconductor that serves the role of a sharp low-pass acoustical filter, can provide a substantially monochromatic beam of phonons, so as to achieve an acoustic analogue of an electronic narrow band pass filter.

What is claimed is:

1. In combination with a generator of polychromatic phonons, a doped semiconductor having free electrons satisfying degenerate statistics, and means for causing said phonons to transverse said semiconductor along a preselected crystallographic direction so that said phonons couple to said free electrons and prevent passage of those phonons of frequencies less than $k_F V_a/\pi$ where $k_F$ is the electron Fermi wave vector and $V_a$ is the phonon velocity along said preselected direction.

2. The combination of claim 1 wherein said doped semiconductor is GaAs.

3. The combination of claim 2 wherein said preselected direction is <110> and said phonons are polarized in the <001> direction.

4. The combination of claim 2 wherein said GaAs is doped with selenium and the doping level is $10^{14}$ to $3\times10^{18}$ carriers per $cm^3$.

5. The filter of claim 1 wherein said doped semiconductor is InSb, doped to a level of $10^{14}$ to $3\times10^{18}$ free carriers per $cm^3$.

6. A compound filter for obtaining a highly monochromatic beam of phonons comprising:

a generator of polychromatic phonons,
an insulator layer contacting said generator,
a superconductive thin metal film contacting said insulator, and
a doped semiconductor having electrons satisfying degenerate statistics contacting said superconductive film.

* * * * *